United States Patent Office 3,234,159
Patented Feb. 8, 1966

3,234,159
PHENOLIC RESINS CONTAINING AMINO-FUNCTIONAL SILANES FOR USE IN CEMENTS AND BINDER COMPOSITIONS
Ronald H. Cooper, Clare, Mich., assignor to The Dow Chemical Company, Midland, Mich., a corporation of Delaware
No Drawing. Filed May 15, 1961, Ser. No. 109,845
1 Claim. (Cl. 260—29.3)

This application relates to compositions of matter comprising phenolic resins and certain organosilicon compounds.

With the growth of chemical technology the need for an acid-resistant cement has become increasingly important. Acid-resistant cements which are not available commercially are in general of two kinds; one is based upon a phenolic resin and the other on an alkali metal silicate. Both of these basic materials are quite resistant to acid when compared with Portland cement. However, they are still not sufficiently acid-resistant to give prolonged life when subjected to acids, especially at elevated temperatures. The latter conditions gradually disintegrate the cement and cause failure at times varying from a few weeks to a year. A further cause of failure is attributed to intermittent exposure to aqueous acid solutions and then atmospheric air. This intermittent exposure results in shrinking and swelling of the brick and mortar which cause failure of the joint.

It is a primary object of the present invention to increase the life of phenolic cements in contact with acid and with water. Another object is to increase the mechanical strength of phenolic cements both in the dry state and when in contact with acids. Another object is to increase the dimensional stability of the cement, i.e. by substantially eliminating the swelling and/or shrinking attendant with intermittent periods of aqueous immersion and air exposure. Another object of the present invention is to improve the tensile strength imparted to phenolic resin-bonded core sands. These and other objects will become apparent to those skilled in the art from the following description.

It has now been found that phenol-aldehyde resins such as are employed in cements, that is to say, brick mortars, bonded sand cores and the like, can be markedly improved by incorporating from about 0.06 to about 10% by weight, based on the weight of the phenolic resin solids, of a silane having the formula $(RO)_3SiR'Zn$ in which each R is an alkyl radical of less than four carbon atoms, R' is an aliphatic hydrocarbon radical and having a valence of $n+1$ where $n$ is an integer of at least 1 and Z is a monovalent radical attached to R' through a carbon-nitrogen bond and is composed of hydrogen and carbon atoms and at least two amine groups. The ratio of carbon atoms to nitrogen atoms in the silicon substituent —R'Zn is less than 6:1. These silanes are described and their method of preparation is taught in U.S. Patent No. 2,971,864, granted February 14, 1961, to John L. Speier.

Any liquid or liquifiable phenol-aldehyde resin can be employed in the compositions of this invention. For example, resins formed by polymerizing phenol with formaldehyde, acetaldehyde, butyraldehyde, and the like as well as resins formed by polymerizing aldehydes with modified phenols such as p-tertiary-butylphenol, p-tertiary-amylphenyl, p-phenylphenol or any other aliphatic- or aryl-substituted phenol. Preferably the phenol-aldehyde resins should be in such a state of polymerization that they set readily at room temperature. If desired, catalysts such as benzene-sulfonyl chloride may be employed to hasten the setting. For the purpose of this invention either oil-modified or non-oil-modified phenol-aldehyde resins may be employed although no apparent advantage is gained by employing oil modification.

The phenolic resin-silane compositions of this invention are useful in bonding various granular materials together as well as bonding the granular material to numerous surfaces. Exemplary of the bonding of granular materials is core sand bonding wherein small quantities of phenolic resins are employed to bond the sand granule together to improve the ability of the shape to withstand the rigors of molten metals poured into molds and the like. Exemplary of the use of the phenolic resins to bond granular materials to each other and to other surfaces is the use of compositions of sand phenolic resin mortars and graphite phenolic resin mortars for joining brick to brick as liners in various chemical production equipment such as acid-proof vessels and the like, as well as bonding the brick to the shell of the equipment. The reference hereinafter to phenolic resin mortars is directed to phenolic resin-silane-filler compositions as used in the masonry trade to join bricks of various characters.

The presence of fillers is preferable for economic reasons since they tend to reduce the amount of phenolic resin needed for any given purpose. Suitable fillers include siliceous materials such as sand, silica flour, diatomaceous earth, carbon, graphite and the like.

In preparing the compositions of this invention, a phenol-aldehyde resin and a silane are mixed in any suitable fashion either by mechanical agitation or by dissolving in a mutual solvent. The resulting material may then be mixed with a suitable filler and a catalyst and applied to the joints to be cemented. No special precautions are needed to blend the materials except that the mixing should be sufficient to give a uniform distribution of the various ingredients.

The amount of silane compound should not exceed about 10% by weight of the weight of the phenol-aldehyde resin solids since larger amounts produce inferior products. The preferred amount of silane compound is from about 0.2 to about 2% by weight based on the weight of the phenol-aldehyde resin solids. These proportions appear to give optimum properties both with regard to physical strength and with regard to water absorption. When the silane compound is present in amounts less than about 0.06% based on the weight of the phenolic resin solids little effect is observed.

The compositions of this invention are particularly useful as acid-resistant cements (mortars). Among the advantages of the compositions of this invention over phenol-aldehyde resin cements containing no silane are: low shrinkage or swelling under humid conditions, improved tensile strength when in contact with acid and water, very high electrical resistivity and a substantially decreased danger of cracking when used for lamination of tanks, in masonry joints, or in solid castings. These advantages extend the service life of the structure.

The compositions of this invention are also useful in phenolic bonded sand core compositions. The principal advantage of the incorporation of a silane into the phenolic resin used in this manner is the increased tensile strength, thus improving the core function in molding. The art teaches that from about 1 to 7% by weight of phenolic resin solids based on the total composition are useful in the sand core bonding art.

The following examples are illustrative only and should not be construed as limiting the invention which is properly delineated in the appended claim.

EXAMPLE 1

Throughout this and the succeeding examples the silane employed was 3-(2-aminoethylamino)propyl-trimethoxy silane.

The phenolic resin employed in this example was a sulfuric acid-catalyzed stage-A resin (one-stage resin) solution composed of 44.5% by weight of phenol, 20.5% by weight of formaldehyde and the balance water. The silane-phenolic resin was prepared then mixed with various fillers and benzenesulfonyl chloride catalyst. The mixture consisted of 55.56 parts by weight of fillers, 39.6 parts by weight of resin solution, 4.84 parts by weight of catalyst and various amounts of silane as indicated in the table. The resulting mixture cast into briquettes. The briquettes were allowed to harden for 24 hours and then subjected to various tests to determine their serviceability. In each test control briquettes were formed from a mortar having no silane in the composition. The compositions employed of about 55% filler, 4.8% catalyst, 39% resin solution and the balance as indicated silane and the results of the various tests are set forth in Table I.

EXAMPLE 2

The same compositions as employed in Example 1 were troweled onto one surface of clay acid-resistant bricks, cured at room temperature for 24 hours, immersed in water at room temperature for six weeks, then exposed to air until failure of the mortar bond was observed. The results of such operations are recorded in Table II.

Table II

Service life of phenolic brick mortar after exposure to water for six weeks and then air-dried

| Parts by Weight of Silane | Type of Filler | Time to Loss of Adhesion | Remarks |
|---|---|---|---|
| Control—None | Silica Flour | 19 hours | Surface cracks—hollow sound to mortar when struck with spatula handle. |
| 3.18 | do | 10 months | No cracks, very good adhesion. |
| 0.79 | do | do | Do. |
| 0.20 | do | 13 days | Some surface cracks—no hollow sound when struck with spatula. |
| Control—None | Graphite | 6 hours | Surface cracks—mortar lifted from brick. |
| 3.18 | do | 10 months | No cracks—very good adhesion. |
| 1.61 | do | do | Do. |
| 0.79 | do | 11 days | Few surface cracks—adhesion fair. |
| 0.20 |  | 3 days | Surface cracks—adhesion poor. |

The following example illustrates the improvement obtained by adding silane to the phenolic resins employed in strengthening sand cores. It is to be understood that the phenolic resin solids can be employed in amounts of from 1 to 7% by weight based on the total composition but that usually from about 1 to 4% by weight is sufficient.

EXAMPLE 3

The following example illustrates the improvement obtained when 0.26 or 0.86% by weight of silane based on resin solids is added to the phenolic resin used in bonding core sands. The resin and silane are employed in about 4% by weight of the total composition. The following table sets forth a comparison of the tensile strength of bonded Ottawa (AFS 80) sand obtained employing various resin and various amounts of silane.

Table I

Tensile strength of silane-phenolic brick mortars formed into briquettes

| Parts by Weight Silane | 30 Days Immersion in 20% HCl at 100° C. | | 30 Days Immersion in Distilled H₂O at 100° C. | | 30 Days Air Dried at 25° C. | |
|---|---|---|---|---|---|---|
| | P.s.i. (Avg.) | Percent greater p.s.i. over control | P.s.i. (Avg.) | Percent greater p.s.i. over control | P.s.i. (Avg.) | Percent greater p.s.i. over control |
| Control [1] | 700 | | 805 | | 1,325 | |
| 1.61 [1] | 1,408 | 100.0 | 1,572 | 95.2 | 1,610 | 21.5 |
| 0.79 [1] | 1,310 | 87.5 | 1,479 | 84.8 | 1,525 | 15.1 |
| 0.20 [1] | 1,395 | 98.4 | 1,588 | 97.4 | 1,495 | 12.8 |
| Control [2] | 1,410 | | 1,093 | | 942 | |
| 3.18 [2] | 1,681 | 19.2 | 1,343 | 23.0 | 1,115 | 18.4 |
| 1.61 [2] | 1,628 | 15.5 | 1,480 | 35.5 | 1,190 | 26.3 |
| 0.79 [2] | 1,570 | 11.4 | 1,485 | 35.9 | 1,115 | 18.4 |
| 0.20 [2] | 1,618 | 14.7 | 1,330 | 21.7 | 1,100 | 96.8 |

[1] Silica flour was the filler used.
[2] Graphite was the filler used.

Table III

Tensile strength of silane-phenolic bonded sand heat cured (425° C. for 15 minutes)

| Type of Phenolic Resin | Silane as percent by Weight Based on Weight of Resin Solids | Tensile Strength | |
|---|---|---|---|
| | | P.s.i. | Percent Increase of p.s.i. over Control |
| Type A [1] | ---------- | 574 | ---------- |
| Type A | 0.26 | 642 | 11.9 |
| Type A | 0.86 | 715 | 24.5 |
| Type B [2] | ---------- | 1,025 | ---------- |
| Type B | 0.21 | 1,185 | 14.6 |
| Type B | 0.86 | 1,280 | 24.8 |

[1] Type A is a one-stage resin evaporated from a NaOH-catalyzed system having a viscosity of 200 centipoises, pH of 9 and a solids content of 70%, mole ratio of formaldehyde/phenol=1.42/1.
[2] Type B is a one-stage resin from a sulfuric acid-catalyzed phenol-formaldehyde resin having a voscosity of 900 centipoises, pH of 5 and a solids content of 70%.

I claim:

Sand core composition comprising 90 to 98% by weight of a silica sand and from 1 to 7% by weight of phenol-formaldehyde resin solids containing from 0.06 to 10% by weight based on the weight of said phenolic resin of a silane having the formula $$(RO)_3Si(CH_2)_3NHCH_2CH_2NH_2$$

wherein R represents an alkyl radical having less than 4 carbon atoms, and the balance water.

References Cited by the Examiner
UNITED STATES PATENTS

| | | | |
|---|---|---|---|
| 2,300,812 | 11/1942 | Rust | 260—41 |
| 2,927,910 | 3/1960 | Cooper | 260—825 |
| 2,971,864 | 2/1961 | Speier | 260—46.5 |
| 2,990,307 | 6/1961 | Stalego | 260—29.3 |

OTHER REFERENCES

Fordham, Silicones, London, Newnes, 1960, page 63.

MURRAY TILLMAN, *Primary Examiner.*

LEON J. BERCOVITZ, *Examiner.*